(12) United States Patent
Benkert et al.

(10) Patent No.: US 8,707,824 B2
(45) Date of Patent: Apr. 29, 2014

(54) BOTTOM BRACKET

(75) Inventors: Frank Benkert, Waigolshausen (DE);
Stefan Glueck, Schweinfurt (DE); Bert Rosenheinrich, Bubenreuth (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 77 days.

(21) Appl. No.: 13/121,255

(22) PCT Filed: Sep. 26, 2009

(86) PCT No.: PCT/DE2009/001358
§ 371 (c)(1),
(2), (4) Date: Mar. 28, 2011

(87) PCT Pub. No.: WO2010/037368
PCT Pub. Date: Apr. 8, 2010

(65) Prior Publication Data
US 2011/0174110 A1 Jul. 21, 2011

(30) Foreign Application Priority Data
Oct. 2, 2008 (DE) .......................... 10 2008 050 236

(51) Int. Cl.
*B62M 3/00* (2006.01)
(52) U.S. Cl.
USPC ....................................... 74/594.2
(58) Field of Classification Search
USPC ............ 74/594.1, 594.2, 594.3; 280/259, 260
See application file for complete search history.

(56) References Cited

U.S. PATENT DOCUMENTS

| | | | |
|---|---|---|---|
| 648,077 A * | 4/1900 | Ludlow | 403/24 |
| 5,493,937 A * | 2/1996 | Edwards | 74/594.1 |
| 5,585,574 A * | 12/1996 | Sugihara et al. | 73/862.334 |
| 5,816,599 A * | 10/1998 | Soejima et al. | 280/259 |
| 2007/0295154 A1 * | 12/2007 | D'Aluisio et al. | 74/594.1 |

FOREIGN PATENT DOCUMENTS

| | | |
|---|---|---|
| DE | 196 09 981 A1 | 9/1997 |
| DE | 196 13 079 A1 | 11/1997 |
| DE | 10 2007 062 156.8 A1 | 6/2009 |
| JP | 2000 335476 A | 12/2000 |

* cited by examiner

*Primary Examiner* — Vicky Johnson
(74) *Attorney, Agent, or Firm* — Lucas & Mercanti, LLP

(57) ABSTRACT

A bottom bracket, which has a shaft, a first pedal crank, which is connected in a rotationally fixed manner to the shaft, a second pedal crank, which is connected in a rotationally fixed manner to the shaft, and a chainring carrier, which is connected to the shaft. The object of providing a bottom bracket with a chainring carrier that is easy to assemble is achieved by the chainring carrier being connected in a rotationally fixed manner to a chainring shaft and by the chainring shaft being connected in a rotationally fixed manner to the shaft.

8 Claims, 2 Drawing Sheets

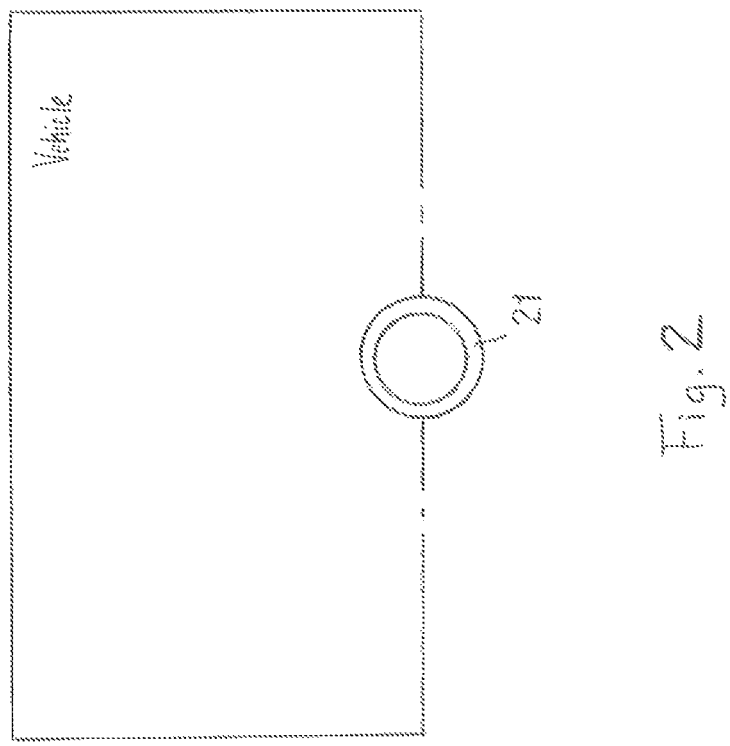

BOTTOM BRACKET

This application is a 371 of PCT/DE2009/001358 filed Sep. 26, 2009, which in turn claims the priority of DE 10 2008 050 236.7 filed Oct. 2, 2008, the priority of both applications is hereby claimed and both applications are incorporated by reference herein.

FIELD OF THE INVENTION

The invention relates to a bottom bracket and a vehicle which may be driven by a pedal crank.

BACKGROUND OF THE INVENTION

It is known from experience to detect separately the torque for each of the two pedal cranks, respectively introduced into a bottom bracket by means of the two pedal cranks. It is also known, for detecting a torque acting on a shaft, to form a magnetized portion on the body of the shaft so that when applying or altering a torque, the magnetized portion alters its magnetization due to the magnetostrictive effect, which may be detected and evaluated by means of a magnetic sensor, for example by means of a coil, a Hall sensor or Reed sensor.

With regard to carrying out the measurement of torques in a shaft by means of the magnetostrictive effect, the correct positioning of the sensor relative to the magnetized portion of the shaft proves problematic. This difficulty increases further if, for a bottom bracket with a shaft and two pedal cranks connected to the shaft, the torque respectively introduced into the shaft is intended to be measured separately, for each of the two pedal cranks.

DE 10 2007 062 156.8, filed on 21 Dec. 2007, discloses a bottom bracket with a shaft formed as a hollow shaft, to which a first pedal crank and a second pedal crank are fastened, the shaft being configured either as an individual hollow shaft receiving both pedal cranks or as two hollow component shafts joined together fixedly in terms of rotation. In both cases, the chainring carrier is joined fixedly in terms of rotation directly to the hollow shaft and/or one of the two hollow component shafts. Such an arrangement proves disadvantageous as the chainring carrier has to be attached before installing the hollow shaft. If the shaft is formed by two hollow component shafts joined together, the assembly cost increases, as the two hollow component shafts still have to be additionally fastened together.

OBJECT OF THE INVENTION

It is the object of the invention to provide a bottom bracket having a chainring carrier which is easy to assemble.

SUMMARY OF THE INVENTION

This object is achieved according to the invention by a bottom bracket which has a shaft, a first pedal crank which is connected fixedly in terms of rotation to the shaft, a second pedal crank which is connected fixedly in terms of rotation to the shaft, a chainring carrier which is connected to the shaft, and a chainring shaft within which the shaft is partially arranged.

During assembly, the chainring carrier is first connected to a chainring shaft and/or is integrally configured with a chainring shaft, in a subsequent assembly step the chainring shaft being fastened to the shaft of the bottom bracket, which may be configured as a solid shaft or hollow shaft.

Preferably, it is provided that the connection of the chainring shaft to the shaft is configured as a screw connection between a thread attached to the chainring shaft and a mating thread attached to the shaft, for which the shaft and/or the chainring shaft in each case are provided with an external thread and/or internal thread, so that the mounting of the chainring carrier is simplified.

Preferably, it is provided that the chainring shaft is configured at least partially as a hollow shaft and that the chainring shaft partially surrounds the shaft. Thus, a lightweight and positionally correct mounting of the chainring shaft results on the shaft. The shaft may thus fully penetrate the chainring shaft so that the shaft, configured as a solid shaft or hollow shaft, allows both pedal cranks to be attached fixedly in terms of rotation directly to the shaft.

Preferably, it is provided that the chainring shaft comprises a first magnetized area on a portion thereof, and that a first sensor is provided which detects an alteration of the first magnetized area when a torque is present in the region of the first magnetized area. Due to the connection of the chainring shaft to the shaft which is fixed in terms of rotation, the torque introduced into the bottom bracket may not only be detected on the shaft but also on the chainring shaft. This proves advantageous, in particular, when the first magnetized area of the chainring shaft is arranged so that said chainring shaft is arranged approximately centrally between the two pedal cranks and thus in a region of the shaft and/or the chainring shaft at which the acting torque corresponds to the sum of the two torques introduced via the individual pedal cranks.

Preferably, it is provided that the shaft comprises a second magnetized area, and that a second sensor is provided which detects an alteration of the second magnetized area when a torque is present in the region of the second magnetized area. The second magnetized area may thus be arranged in a region in which the torque corresponds to the torque introduced by one of the two pedal cranks into the shaft. Together with the torque introduced as a whole into the shaft, which for example may be detected on the chainring shaft connected fixedly in terms of rotation to the shaft, for each of the two pedal cranks the torque introduced in each case may either be directly detected or calculated from the total torque by calculating the difference.

Preferably, with regard to the arrangement of the first and second sensor, it is provided that the first sensor and the second sensor are received in a sub-assembly which partially surrounds the shaft and the chain carrier shaft. The rigid sub-assembly thus permits a rapid and simple, as well as reproducible, positioning of both sensors relative to the two magnetized areas on the shaft and/or on the chain shaft.

Preferably, it is provided that a means is provided for detecting the rotational speed of the shaft, the means for detecting the rotational speed of the shaft being able to be arranged, for example, in the aforementioned sub-assembly receiving the two sensors. With the knowledge of the rotational speed and both torques of both pedal cranks introduced into the shaft, the power of the operator of the pedal cranks exerted on the respective pedal cranks may be calculated, for example in an evaluation unit connected in series.

Further advantages and features of the invention are revealed from the dependent claims and from the following description of an exemplary embodiment.

The invention is described in more detail and explained hereinafter with reference to the accompanying drawing.

BRIEF DESCRIPTION OF THE DRAWING

The present invention will be further understood and appreciated by reading the following description in conjunction with the accompanying drawing, in which:

FIG. 2 shows a schematic diagram of a housing of the bracket connected to a vehicle.

DETAILED DESCRIPTION OF THE DRAWING

Figure 1:
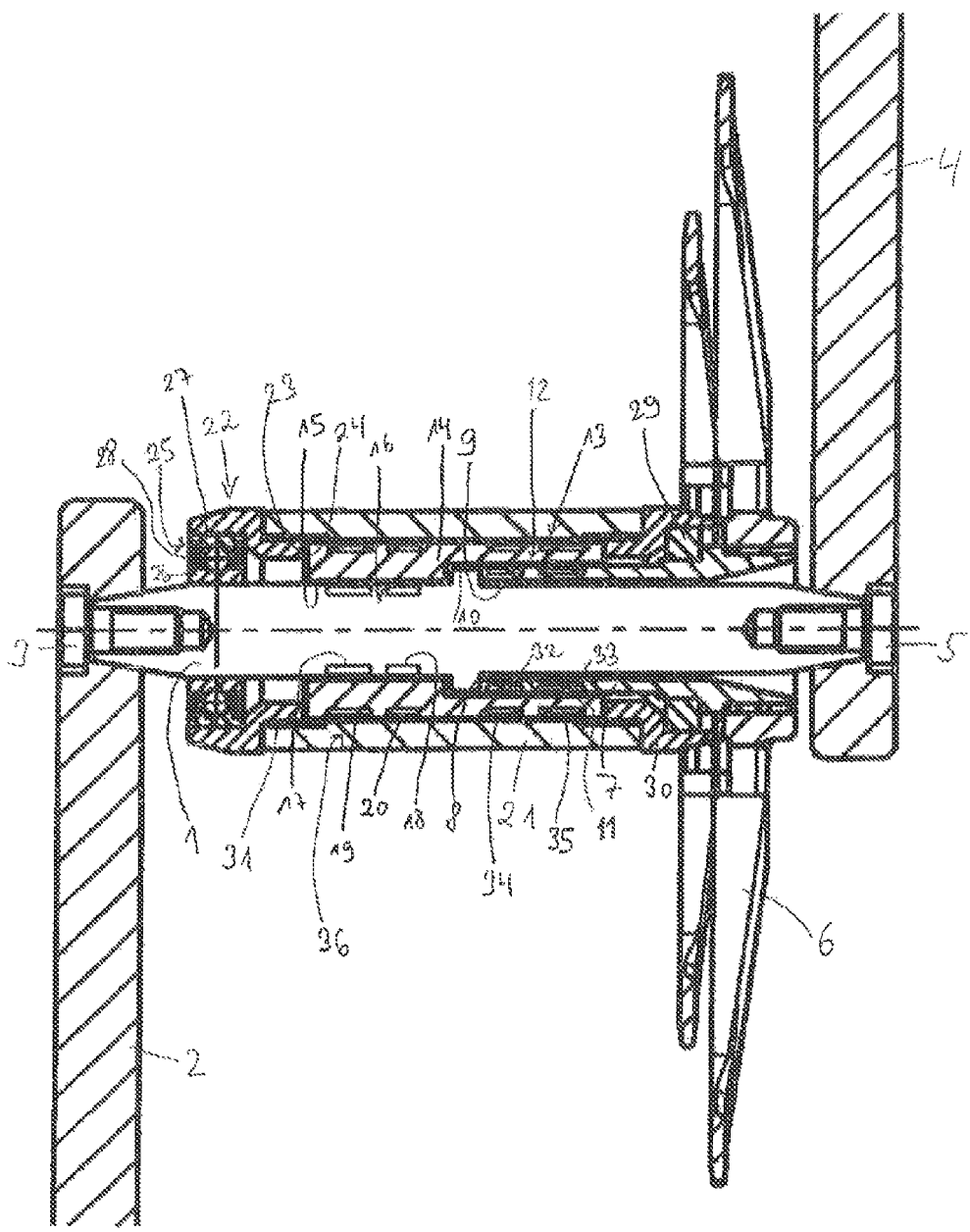
FIG. 1 shows a schematic section through an exemplary embodiment of a bottom bracket according to the invention of an exemplary embodiment of a vehicle according to the invention.

FIG. 1 shows a bottom bracket which is part of the drive of a bicycle. The bottom bracket comprises a shaft 1 configured as a solid shaft, a first pedal crank 2, which is connected fixedly in terms of rotation to the shaft 1 by means of a first screw connection 3, as well as a second pedal crank 4, which is also connected fixedly in terms of rotation to the shaft 1 by means of a second screw connection 5.

The bottom bracket further comprises a chainring carrier 6, which is arranged fixedly in terms of rotation, for example, by means of a press fit on a chainring shaft 7. The chainring shaft 7 is configured as a hollow shaft, within which the shaft 1 is partially arranged.

The chainring shaft 7 is connected fixedly in terms of rotation to the shaft 1. The chainring shaft 7 has on an end portion 8 an internal thread which engages with an external thread on a central portion 9 of the shaft 1, so that the connection of the chainring shaft 7 to the shaft 1 is formed as a screw connection between the internal thread and the external thread.

Adjacent to the central portion 9 of the shaft 1 as well as the end portion 8 of the chainring shaft 7 is provided a widening 10 of the shaft 1, which is provided as an end stop for the chainring shaft 7 and against which the end portion 8 of the chainring shaft 7 bears. The connection which is fixed in terms of rotation between the shaft 1 and the chainring shaft 7 by the screw connection arranged substantially centrally between the two pedal cranks 2, 4, ensures that the torque introduced into the chainring shaft 7 is the (signed) sum of the two torques introduced into the pedal cranks 2, 4, i.e. the net torque. Thus on the chainring shaft 7 the net torque introduced into the shaft 1 may be detected and read out.

On the outer peripheral surface 11 of the chainring shaft 7 a first magnetized area 12 is provided on a portion thereof, and which, due to the magnetostrictive effect, is altered in magnitude and/or direction, as soon as a torque is applied in the region of the first magnetized area 12, which produces mechanical stresses in the region of the first magnetized area in the body of the chainring shaft 7. The magnetic field of the first magnetized area 12 and/or the alteration of the magnetic field of the first magnetized area 12 is detected by a first sensor 13 which is arranged structurally separate from the chainring shaft 7 and the shaft 1 in a sub-assembly 14. The first magnetized area 12 comprises a first magnetized portion 32 and an axially spaced-apart, second magnetized portion 33, the two magnetized portions 32, 33 being magnetized in opposing directions relative to one another, so that the respective magnetic field circulates around the chainring shaft 7 clockwise and/or counter-clockwise. A magnetic sub-sensor 34, 35 is respectively associated with each of the two magnetized portions 32, 33, the respective sub-sensor 34, 35 detecting the magnetic field of the magnetized portion 32, 33. The two sub-sensors 34, 35 are interposed relative to the first sensor 13, which detects the resulting net magnetic field of the two magnetized portions 32, 33 of the first magnetized area 12. The respective magnetization of the first magnetized portion 32 and of the second magnetized portion 33 is selected in magnitude and direction so that where no torque is present in the chainring shaft 7, an imperceptible net magnetic field is detected in the sensor 13. If a torque is produced in the chainring shaft 7, the magnetization of one of the two magnetized portions 32, 33 is increased relative to the magnetization of the other of the two magnetized portions 32, 33, so that a net magnetic field which is not imperceptible is detected in the sensor 13, which in magnitude and direction corresponds to the torque in the chainring shaft 7.

A second magnetized area 16 is provided on an external peripheral surface 15 of the body of the shaft 1. The second magnetized area 16 comprises a first magnetized portion 17 and a second magnetized portion 18 axially spaced apart therefrom, the two magnetized portions 17, 18 being magnetized in opposing directions to one another, so that the respective magnetic field circulates around the shaft 1 clockwise and/or counter-clockwise. A magnetic sub-sensor 19, 20 is associated in each case with the two magnetized portions 17, 18. The two sub-sensors 19, 20 are interposed relative to a common second sensor 36, which detects the net magnetic field of the individual magnetized portions 17, 18 of the second magnetized area 16. The spatial separation of the second magnetized area 16 into the two axially spaced apart magnetized portions 17, 18 permits the elimination of interfering signals, in particular those which are not based on mechanical stress in the body of the shaft 1 due to torques introduced via the first pedal crank 2.

The sub-sensors 19, 20 of a second sensor 36 and/or the first sensor 13 with the sub-sensors 34, 35 are, for example, each configured as Hall sensors. The sub-sensors 19, 20 of the second sensor 36 and of the first sensor 13 with the sub-sensors 34, 35 are fastened and received in the sub-assembly 14, the sub-assembly 14 partially surrounding the shaft 1 and the chainring shaft 7. The sub-assembly 14 is produced from a non-magnetic material, in particular, as an injection-molded part made of a plastics material. Also received in the sub-assembly 14 is a means for detecting the rotational speed of the shaft 1 and/or of the chainring shaft 7, said means not being illustrated and, for example, being able to be based on an optical detection and evaluation of a structure on the peripheral surface of the body of the shaft 1 and/or of the chainring shaft 7.

For the correct positioning of the first sensor 13 and the sub-sensors 19, 20 of the second sensor in the sub-assembly 14 relative to the shaft 1 and the chainring carrier shaft 7 as well as a housing 21 of the bicycle, a first intermediate element 22 is provided which is configured as a stepped hollow cylinder, and at its end portion 23 has a step 24 on which a first end of the sub-assembly 14 is received, the sub-assembly 14 maintaining a distance from the housing 21 by means of the end portion 23. The first intermediate element 22 is mounted on the shaft 1 by means of a rolling bearing 25, an inner race 26 of the rolling bearing 25 being fastened fixedly in terms of rotation directly to the peripheral surface 15 of the shaft 1 and an outer race 27 of the rolling bearing 25 being attached fixedly in terms of rotation to the first intermediate element 22. The rotatability of the shaft 1 relative to the first intermediate element 22 is permitted by rolling bodies 28 in the rolling hearing 25.

A second end of the sub-assembly 14 is mounted on the outer peripheral surface 11 of the chainring shaft 7 by means of a further rolling bearing 29. To this end, a second intermediate element 30 is provided which supports the second end of the sub-assembly 14 on a step, the second intermediate element 30 being structurally the same as the first intermediate element 22. Both intermediate elements 22, 30 have a thread by which the intermediate elements 22, 30 may be screwed into a mating thread arranged on the housing 21, and thus secured.

During operation, the first sensor 13 detects alterations to the first magnetized area 12 occurring in the region of the first magnetized area 12, denoting the net torque of the shaft 1. The second sensor 36 with the two sub-sensors 19, 20 also detects in the region of the first pedal crank 2 torques introduced into the bottom bracket. The torque introduced by the second pedal crank 4 may be calculated from the net torque by calculating the difference.

The invention has been disclosed and explained above in more detail with reference to an exemplary embodiment, in which the inner race 26 has been arranged on the outer peripheral surface 15 of the shaft 1. It goes without saying that the rolling bearing 25 does not need to comprise an inner race so that the rolling bodies 28 roll directly on the outer peripheral surface 15 of the shaft 1. It also goes without saying that the further rolling hearing 29 also does not need to have an inner race, so that the rolling bodies of the further rolling bearing 29 roll directly on the outer peripheral surface 11 of the chainring shaft 7.

In the above disclosed exemplary embodiment, not only the first pedal crank 2 but also the second pedal crank 4 has been directly fastened to the shaft 1, by means of the second screw connection 5. It goes without saying that the second pedal crank 4 is only able to be fastened indirectly to the shaft 1, for example so that the second pedal crank 4 is fastened directly to the chainring shaft 7, which in turn is arranged fixedly in terms of rotation on the shaft 1. Thus, the rotational direction in which the second pedal crank 4 is operated is the direction opposing the direction of rotation with which the thread arranged on the chainring shaft 7 is screwed into the mating thread arranged on the shaft 1.

In the exemplary embodiment disclosed above, the shaft 1 has been configured as a solid shaft. It goes without saying that the shaft 1 may also be configured as a hollow shaft, outside which the chainring shaft 7 is arranged. The portion of the chainring shaft 7 arranged outside the shaft 1 may thus be configured as a hollow shaft.

FIG. 2 shows the housing 21 of the bottom bracket in FIG. 1 situated in a vehicle frame of a vehicle such as a bicycle, a pedal-powered car, and exercise machine, or an electric bicycle.

The invention claimed is:

1. A bottom bracket comprising
a shaft having a first end, a second end, and a central portion centrally positioned relative to a longitudinal length of the shaft;
a first pedal crank which is connected fixedly in terms of rotation to the shaft;
a second pedal crank which is connected fixedly in terms of rotation to the shaft;
a chainring carrier which is connected to the shaft; and
a chainring shaft configured as a hollow shaft, and the shaft is partially arranged radially within the chainring shaft, wherein the chainring carrier is connected fixedly in terms of rotation to the chainring shaft, and in that the chainring shaft is connected fixedly in terms of rotation to the shaft at the central portion of the shaft.

2. The bottom bracket as claimed in claim 1, wherein the chainring shaft has a threading and the shaft has a threading which engages the threading of the chainring shaft, and the chainring shaft is connected fixedly to the shaft by engagement of the threading of the chainring shaft with the threading of the shaft.

3. The bottom bracket as claimed in claim 1, wherein the chainring shaft has a first end at the central portion of the shaft and extends from the central portion toward the second end of the shaft.

4. The bottom bracket as claimed in claim 1, wherein the chainring shaft has a first magnetized area on a portion the chainring shaft and a first sensor which detects an alteration of the first magnetized area when a torque is present in a region of the first magnetized area, the first magnetized area being configured so that the torque in the region of the first magnetized area corresponds to a net torque of the shaft.

5. The bottom bracket as claimed in claim 4, wherein the shaft has a second magnetized area and a second sensor which detects an alteration of the second magnetized area when a torque is present in a region of the second magnetized area, the second magnetized area being configured so that the torque in the region of the second magnetized area corresponds to torque introduced by the first pedal crank.

6. The bottom bracket as claimed in claim 4, further comprising a sub-assembly, wherein the shaft has a second magnetized area and a second sensor which detects an alteration of the second magnetized area when a torque is present in a region of the second magnetized area, and the first sensor and the second sensor are received in the sub-assembly which partially surrounds the shaft and the chainring shaft.

7. The bottom bracket as claimed in claim 1, further comprising a means for detecting rotational speed of the shaft.

8. A vehicle which is drivable by a pedal crank, comprising:
a bottom bracket, which has a shaft having a first end, a second end, and a central portion centrally positioned relative to a longitudinal length of the shaft; a first pedal crank which is connected fixedly in terms of rotation to the shaft; a second pedal crank which is connected fixedly in terms of rotation to the shaft; a chainring carrier which is connected to the shaft; and a chainring shaft configured as a hollow shaft, and the shaft is partially arranged radially within the chainring shaft, wherein the chainring carrier is connected fixedly in terms of rotation to the chainring shaft, and in that the chainring shaft is connected fixedly in terms of rotation to the shaft at the central portion of the shaft.

* * * * *